United States Patent [19]

Loesel, Jr. et al.

[11] Patent Number: 4,905,873

[45] Date of Patent: * Mar. 6, 1990

[54] LIQUID SOAP DISPENSER

[75] Inventors: John L. Loesel, Jr., San Marino; Daniel W. Ashcraft, Torrance, both of Calif.

[73] Assignee: The Dial Corporation, Phoenix, Ariz.

[*] Notice: The portion of the term of this patent subsequent to Dec. 20, 2005 has been disclaimed.

[21] Appl. No.: 211,356

[22] Filed: Jun. 24, 1988

Related U.S. Application Data

[63] Continuation of Ser. No. 895,838, Aug. 12, 1986, Pat. No.

[51] Int. Cl.4 .......................... B67D 5/06; B65D 37/00
[52] U.S. Cl. ..................................... 222/181; 222/164; 222/185; 222/212; 222/494; 248/311.3; 403/381
[58] Field of Search ................. 222/95, 105, 181, 214, 222/185, 494, 213, 212, 164; 248/311.3; 403/381

[56] References Cited

U.S. PATENT DOCUMENTS 3,078,016 2/1963 Judy ..................................... 222/181
4,324,348 4/1982 Johnson ........................... 222/185 X
4,470,523 9/1984 Spector ............................ 222/181 X
4,634,022 1/1987 O'Halloran et al. ............. 222/181 X
4,792,064 12/1988 Losel, Jr. et al. ................ 222/185 X

FOREIGN PATENT DOCUMENTS 3333569 3/1985 Fed. Rep. of Germany ...... 222/181
508386 7/1871 Switzerland ........................ 222/181

Primary Examiner—Joseph J. Rolla
Assistant Examiner—Gregory L. Huson
Attorney, Agent, or Firm—Richard G. Harrer; Bernard L. Howard

[57] ABSTRACT

The present invention is directed to a dispenser for dispensing viscous liquids, such as liquid soap, disinfectants and similar products, comprising a reservoir forming a reservoir for the liquid having an obliquely extending outlet which is provided with a self closing venting valve. A wall mounting assembly in which the dispenser is mounted, is provided with a protruding member, against which the reservoir is compressed to dispense liquid contained in the reservoir. The reservoir can be arranged in two different configurations, so that the dispenser can be mounted to both vertical and horizontal walls and the outlet assembly extends vertically downward.

6 Claims, 2 Drawing Sheets

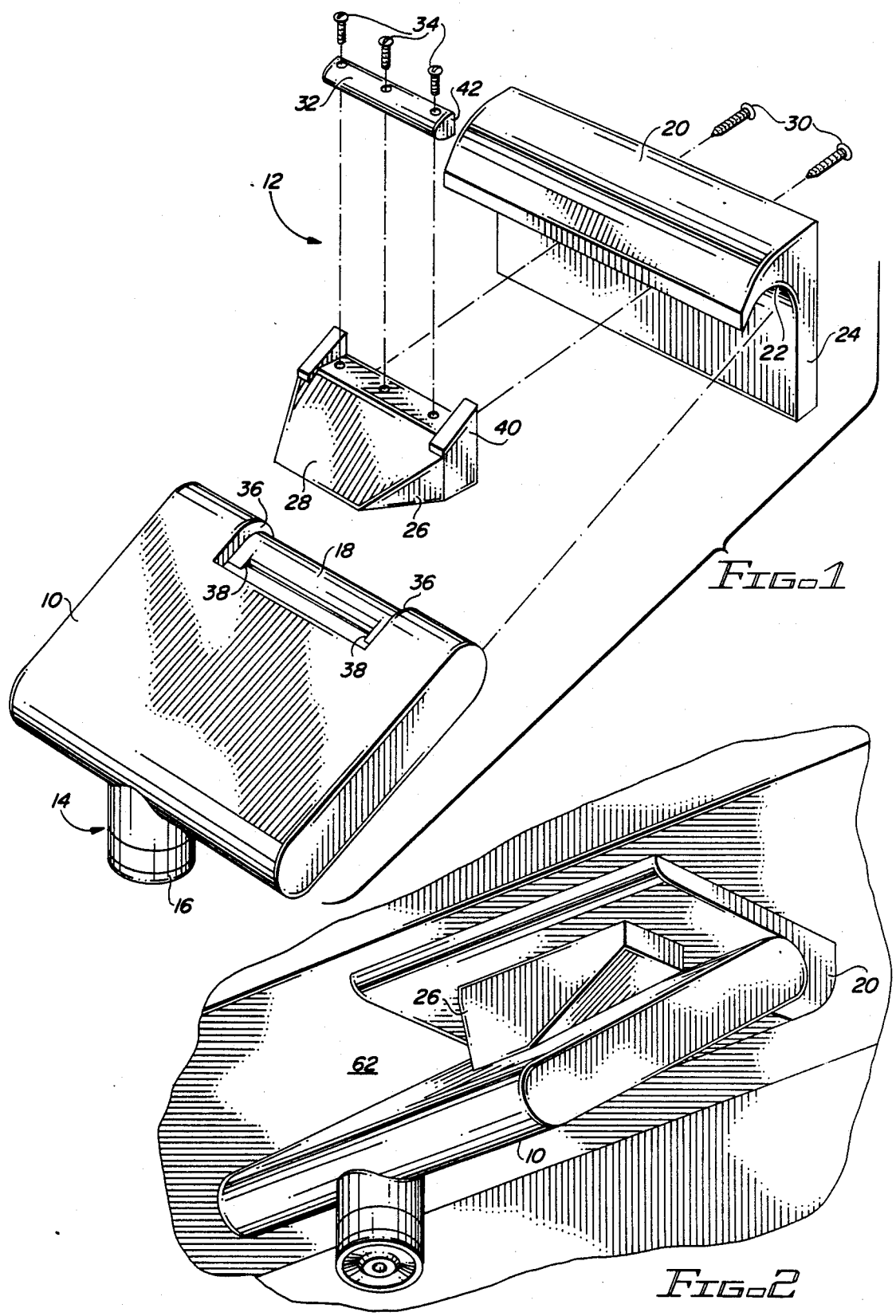

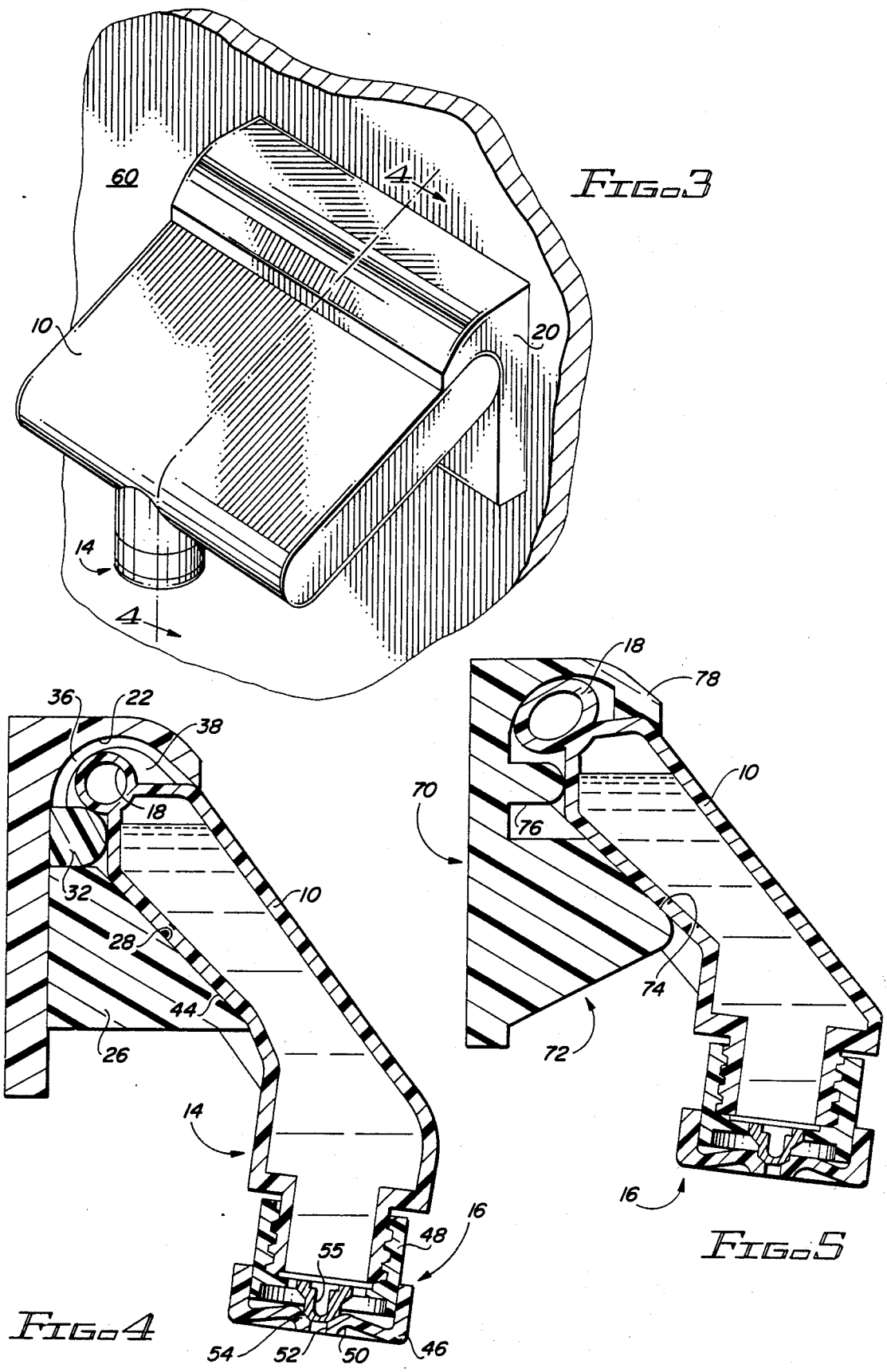

LIQUID SOAP DISPENSER

This application is a continuation of application Ser. No. 06/895,838, filed 8/12/86, now U.S. Pat. No. 4,792,064.

BACKGROUND OF THE INVENTION

1. Field of the Invention

The invention is directed to a liquid dispenser and wall mounting assembly for dispensing soap, disinfectants and similar viscous liquids.

2. Description of the Prior Art

It is well known to mount liquid dispensers for dispensing soap on a wall. Typically these soap dispensers comprise flexible bladders forming reservoirs for the soap. The bladders are manually compressed pressurizing the liquid contained therein and forcing it out through an outlet assembly. The bladders are replaceable, and after a bladder has been emptied, a new liquid containing bladder is inserted into the wall mounting assembly. The bladders are mounted to a wall by various means, including adhesives, suction cups and mounting plates or brackets, see U.S. Pat. Nos. 3,623,641, 4,166,553 and 4,470,523.

Special assemblies have also been provided for compressing the bladders. These assemblies are typically coupled to the mounting assembly or housing and may comprise sliding lever assemblies that also actuate a valve structure, see U.S. Pat. No. 4,258,865; or pivottable housing members having projections that compress the bladder during pivotting, see U.S. Pat. No. 4,324,348. Both of these special compression assemblies are secured to a housing, that encases the bladder, and are provided with moving parts that form the compression assemblies. As such these assemblies are relatively complex, when compared to the more simple dispensers when the operator directly pushes or squeezes the bladder, pressurizing its contents.

SUMMARY

The present invention is directed to a liquid dispenser having a relatively simple structure, which maybe used in a relatively simple manner. A liquid containing bladder forms the dispenser and is replaceable. After a first bladder has been emptied it can be easily removed and a second full bladder inserted into a wall mounting assembly.

The present invention comprises a liquid dispenser having a bladder forming a liquid containing reservoir. The bladder is formed from a flexible and resilient plastic material and is provided with an obliquely extending outlet structure. The end of the outlet structure is provided with a valve means for opening and closing the bladder. A cylindrical portion is integrally formed along one side of the bladder and comprises a mounting means for releasably securing the bladder to a wall mounting assembly.

The bladder is secured to a wall mounting assembly which comprises a J-shaped bracket wherein the inner curve of the bracket provides a receiving means for receiving and gripping the cylindrical portion of the bladder. A locking means is also positioned in the inner curve of the J-shaped bracket to further hold the cylindrical portion. A protruding means having an oblique surface is secured to the stem of the J-shaped bracket and contacts the bladder. As a user presses against the bladder, the bladder contacts the oblique surface compressing the bladder and pressurizing the liquid stored therein.

The cylindrical portion of the bladder and the receiving means of the J-shaped bracket form a cooperating structure that allows the bladder to be mounted in two different and opposite configurations. In the first configuration the outlet structure extends parallel to the stem of the J-shaped bracket, and in the second configuration the outlet structure extends perpendicular to the stem of the J-shaped bracket. As such, the bracket can be mounted on either a vertical or horizontal wall with the bladder arranged so that the outlet structure extends vertically downward.

BRIEF DESCRIPTION OF THE DRAWINGS

FIG. 1 is an exploded view of the liquid dispenser and the associated wall mounting assembly.

FIG. 2 is a perspective view of the liquid dispenser mounted on a horizontal wall.

FIG. 3 is a perspective view of the liquid dispenser mounted on a vertical wall.

FIG. 4 is a cross sectional view taken along line 4—4.

FIG. 5 is a cross sectional view of an alternate embodiment.

DETAILED DESCRIPTION

FIG. 1 illustrates an exploded view of the present invention. The soap dispenser of the present invention comprises a flexible and resilient reservoir or bladder 10 which is secured in wall mounting assembly 12. The bladder is provided with obliquely extending outlet means 14 having valve means 16. In addition the bladder is provided with cylindrical portion 18 that forms a mounting means which is releasably engaged in wall mounting assembly 12.

The mounting assembly comprises J-shaped bracket 20 having inner curve 22 and stem 24. A protruding means 26 having oblique surface 28 is secured to the stem of the J-shaped bracket by screws 30. A rounded protuberance forming locking means 32 is positioned in the inner curve of the J-shaped bracket and held in place by screws 34 which are received in threaded holes on the protruding means.

As illustrated in FIG. 4, inner curve 22 of the bracket forms a receiving means for receiving the mounting means for the bladder formed by cylindrical portion 18. The bladder is placed in the bracket by aligning cylindrical portion 18 with locking means 32 and pushing the cylindrical portion and bladder into the inner curve of the J-shaped bracket. The curved portion of the bracket and the cylindrical portion of the bladder are sufficiently flexible and resilient to allow these elements to temporarily deform as the cylindrical portion is forced into the inner curve, and then to return to their original shapes gripping the cylindrical portion between the inner curve and locking means 32.

To prevent the bladder from becoming dislodged by a sideways force, the bladder is provided with opposing pairs of locking shoulders 36 and 38. The first pair of locking shoulders 36 engage sides 40 of the protruding means. The second pair of locking shoulders 38 engage sides 42 of the locking means. As will be appreciated by a person having ordinary skill in the art, the cylindrical portion and locking shoulders are integrally formed with the bladder durings its manufacture, and together form the mounting means for the bladder.

Obliquely extending outlet member 14 extends outward from planar surface 44 of the bladder at an angle of approximately 130 degrees. The outlet member provides an orifice for dispensing the liquid contained in the bladder and is provided with self-closing venting valve 16. The valve is similar to the valve member disclosed in U.S. Pat. No. 4,474,314, and comprises rotatable cap 46 and threaded base portion 48 that is threaded onto outlet 14. The cap is provided with diaphram 50 having central aperture 52 that engages valve seat 54 that is mounted on a series of raidal spokes extending form the base portion to the valve seat. The valve seat is located on pedestal 55 which is provided with axial grooves through which the liquid is dispensed. When the liquid in the bladder is pressurized by compressing the bladder against the protruding means, diaphram 50 deflects outwardly disengaging valve seat 54 from aperture 52 and providing a dispensing path for the liquid. Venting of the valve is accomplished by providing radial grooves in the rim surface of base portion 48. Viscous liquid wll not pass through these grooves because of its relatively high viscosity when compared to air. The dispensing orifice and the venting passages can be closed off by rotation of cap 46 to a closed position so that the dispensing grooves of pedestal 55 and the radial grooves of the venting means are closed by structures associated with the rotated cap.

One of the principal features of the present invention is the how the mounting means of the bladder and the receiving mean of the bracket are arranged and cooperate so that the bladder and orifice structure can be mounted in the wall mounting assembly in two different configurations. The first configuration is illustrated in FIG. 3, and discloses bracket 20 that is secured to vertical wall 60 by screws or other securing means. Bladder 10 is locked into the bracket and outlet means 14 extends vertically downward so that all of the liquid in the bladder can be drained therefrom. In other words, the outlet means extends parallel to the stem of the J-shaped bracket.

The second mounting configuration is illustrated in FIG. 2, which discloses mounting bracket 20 which is secured to horizontal wall 62. As illustrated, bladder 10 is locked into the bracket, and outlet means 14 extends vertically downward so that all of the liquid contained in the bladder can be drained therefrom. In this configuration the outlet means extends perpendicular to the stem of the J-shaped bracket.

As illustrated in FIG. 4, oblique surface 28 of protruding means 26 supports the bladder when it is mounted in the first configuration. The oblique surface of the protruding means also provides a surface against which the bladder is compressed when a user forces the bladder towards the bracket, thereby pressurizing the bladder and dispensing liquid through the outlet means. In the second configuration, the inner curve of the J-shaped bracket supports the bladder.

FIG. 5 illustrates an alternate embodiment wherein J-shaped bracket 70 is integrally formed during a molding operation. The bracket is provided with a protruding means 72 having oblique surface 74, which as with the first embodiment, is used for pressurizing the bladder. This bracket is also provided with a rounded ridge 76 forming a portion of the locking means, similar to the first embodiment. However the locking means further comprises inwardly projecting rim 78 located at the end of the curved portion of the J-shaped bracket. Therefore ridge 76 and rim 78 are used to trap cylindrical portion 18 of the bladder. As with the first embodiment the J-shaped bracket may be secured to a wall by screws, adhesives or other securing means.

It should be noted that inwardly projecting rim 78 may be discontinuous and comprise two inwardly projecting portions. These portions would be located in the bracket so that their outside surfaces engage locking shoulders located on the bladder.

The present invention should not be limited to the above described embodiments, but should be limited solely by the claims that follow:

We claim:

1. An assembly for dispensing liquid soap, disinfectants and similar products comprising:
   a flexible and resilient reservoir for the liquid to be dispensed, said reservoir having at least one side thereof that is planar and provided with outlet means on one end thereof and mounting means on the opposite end thereof, said outlet means extending in an oblique manner from said planar side;
   wall mounting means to which said reservoir is releasably secured, said wall mounting means comprising a J-shaped bracket with means for securing said bracket to a wall and wherein the inner curve of said J-shaped bracket comprises receiving means for releasably securing the mounting means of said reservoir to said bracket;
   said bracket being further provided with protruding means on the stem thereof, said protruding means having an oblique surface against which a side of said reservoir is located and against which said reservoir is pressed when a liquid in the reservoir is to be dispensed, said oblique surface being formed at such an angle relative to the orientation of said obliquely extending outlet means that when said assembly is mounted on a vertical surface said outlet means extends vertically downward.

2. The assembly of claim 1 wherein the mounting means of said reservoir is adapted and constructed so that the reservoir can be reversibly mounted in said J-shaped bracket whereby said outlet means extends substantially parallel to the stem of said J-shaped bracket when said assembly is mounted to a vertical surface and substantially perpendicular to said stem when said assembly is mounted to a horizontal surface.

3. The assembly of claim 2 wherein the mounting means of said reservoir is cylindrical shaped.

4. The assembly of claim 1 wherein the inner curve of said J-shaped bracket is provided with locking means for locking the mounting means of said reservoir in said bracket.

5. The assembly of claim 4 wherein said locking means comprises a rounded protuberance.

6. The assembly of claim 5 wherein said locking means further comprises an inwardly projecting rim located at the edge of the inner curve of said J-shaped bracket.

* * * * *